United States Patent
Dawkins et al.

(10) Patent No.: US 8,087,076 B2
(45) Date of Patent: *Dec. 27, 2011

(54) METHOD AND APPARATUS FOR PREVENTING LOADING AND EXECUTION OF ROGUE OPERATING SYSTEMS IN A LOGICAL PARTITIONED DATA PROCESSING SYSTEM

(75) Inventors: George John Dawkins, Austin, TX (US); Gordon D. McIntosh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/257,520

(22) Filed: Oct. 24, 2008

(65) Prior Publication Data

US 2009/0044267 A1    Feb. 12, 2009

Related U.S. Application Data

(63) Continuation of application No. 10/809,674, filed on Mar. 25, 2004, now Pat. No. 7,464,405.

(51) Int. Cl.
*G11C 7/00* (2006.01)

(52) U.S. Cl. .............. 726/16; 726/4; 726/12; 726/17; 380/277; 380/278; 713/2; 340/5.24; 340/5.64; 340/541

(58) Field of Classification Search .............. 726/4, 16, 726/17, 12, 6; 340/540, 541, 5.24, 5.64; 380/277, 278; 713/2

See application file for complete search history.

(56) References Cited

U.S. PATENT DOCUMENTS

| 5,103,476 | A | 4/1992 | Waite et al. |
| 5,586,260 | A | 12/1996 | Hu |
| 5,771,291 | A | 6/1998 | Newton et al. |
| 6,198,824 | B1 | 3/2001 | Shambroom |
| 6,289,334 | B1 | 9/2001 | Reiner et al. |
| 6,356,863 | B1 | 3/2002 | Sayle |
| 6,665,759 | B2 | 12/2003 | Dawkins et al. |
| 6,725,284 | B2 | 4/2004 | Arndt |
| 6,877,158 | B1 | 4/2005 | Arndt |
| 2002/0124201 | A1 | 9/2002 | Edwards et al. |
| 2003/0084346 | A1 | 5/2003 | Kozuch et al. |
| 2004/0061591 | A1* | 4/2004 | Teich ........................ 340/5.24 |

FOREIGN PATENT DOCUMENTS

| JP | 04107631 | 4/1992 |
| JP | 06324858 | 11/1994 |
| JP | 11345117 | 12/1999 |
| JP | 2001344096 | 12/2001 |
| JP | 2002258965 | 9/2002 |
| JP | 2003108257 | 4/2003 |
| JP | 2002166032 | 1/2004 |

* cited by examiner

*Primary Examiner* — Thanhnga Truong
(74) *Attorney, Agent, or Firm* — Yee & Associates, P.C.

(57) ABSTRACT

A method, apparatus, and computer instructions for managing operating systems. A request from an operating system is received in the multi-partitioned data processing system to register for access to hardware in the multi-partitioned data processing system. The request includes a key code for the operating system. A determination is made as to whether the operating system is an authorized operating system using the key code in response to receiving the request. The operating system is registered if the operating system is the authorized operating system. Otherwise, the operating system is terminated.

16 Claims, 4 Drawing Sheets

100 DATA PROCESSING SYSTEM

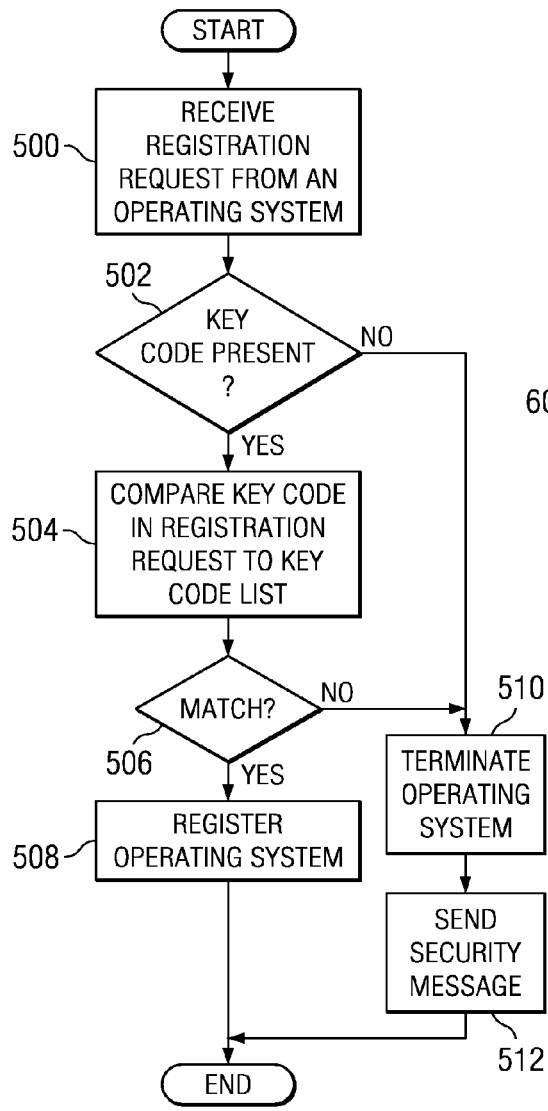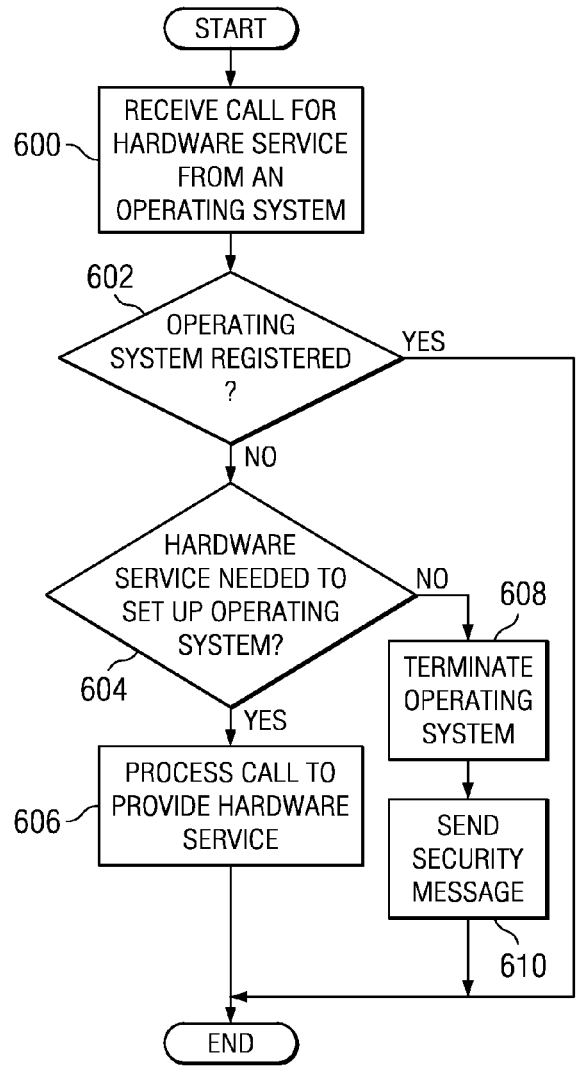

METHOD AND APPARATUS FOR PREVENTING LOADING AND EXECUTION OF ROGUE OPERATING SYSTEMS IN A LOGICAL PARTITIONED DATA PROCESSING SYSTEM

This application is a continuation of application Ser. No. 10/809,674, filed Mar. 25, 2004.

BACKGROUND OF THE INVENTION

1. Technical Field

The present invention relates generally to an improved data processing system and in particular to a method, apparatus, and computer instructions for processing data. Still more particularly, the present invention relates to a method, apparatus, and computer instructions for managing operating systems in a logical partitioned data processing system.

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are configured as multi-partition enabled systems. In other words, a single physical data processing system has multiple partitions in which each partition has an operating system. These partitions may execute concurrently.

When the partitions are made in a logical manner, these systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocatable resources within the platform.

With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

Currently, a system administrator can load operating systems for a logical partitioned data processing system, but is unable to know whether the operating system is a rogue or unauthorized operating system, one that has been illegally modified. In logical partitioned data processing systems that have been enabled to run multiple operating systems simultaneously, it is critical that a rogue or unauthorized operating system is not allowed to load and execute. This requirement is especially important with operating systems that support simultaneous multithreading (SMT) and sub-processor partitioning (SPP). If an unauthorized operating system is allowed to load, this operating system has automatic privilege levels that are sufficient to allow calls into the platform firmware.

With these privileges, an unauthorized operating system may attempt to penetrate the system and at the very least cause a loss of resources through denial of service attack attempts. The problem with an unauthorized operating system is more critical in SMT and SPP enabled systems because the unauthorized operating system may share processor facilities, rather than using isolated processors, and may be able to influence the other partitions to a greater extent.

Currently, no mechanisms are present to limit the loading of unauthorized operating systems. Therefore, it would be advantageous to have an improved method, apparatus, and computer instructions for preventing an unauthorized operating system from loading and executing in a logical partitioned data processing system.

SUMMARY OF THE INVENTION

The present invention provides a method, apparatus, and computer instructions for managing operating systems. A request from an operating system is received in the logical partitioned data processing system to register for access to hardware in the logical partitioned data processing system. The request includes a key code for the operating system. A determination is made as to whether the operating system is an authorized operating system using the key code in response to receiving the request. The operating system is registered if the operating system is the authorized operating system. Otherwise, the operating system is terminated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for handling a registration request from an operating system in accordance with a preferred embodiment of the present invention; and FIG. 6 is a flowchart of a process for handling requests for hardware services in accordance with a preferred embodiment of the present invention.

DETAILED DESCRIPTION OF THE PREFERRED EMBODIMENT

Figure 1:
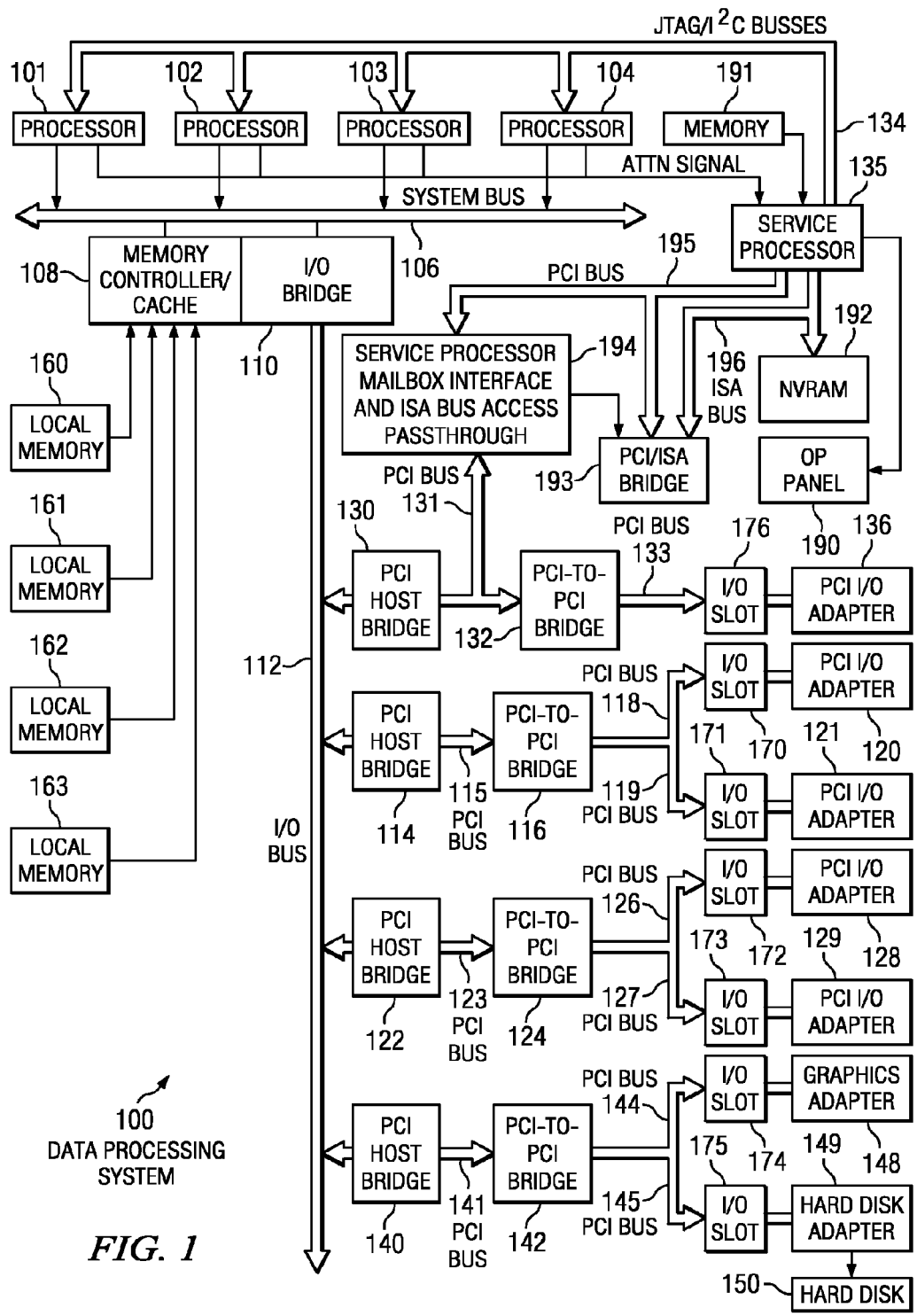
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 1011 some portion of memory from local memories 160-163, and I/O adapters 120, 128, and 129 may be assigned to logical partition PI; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATS, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eserver iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
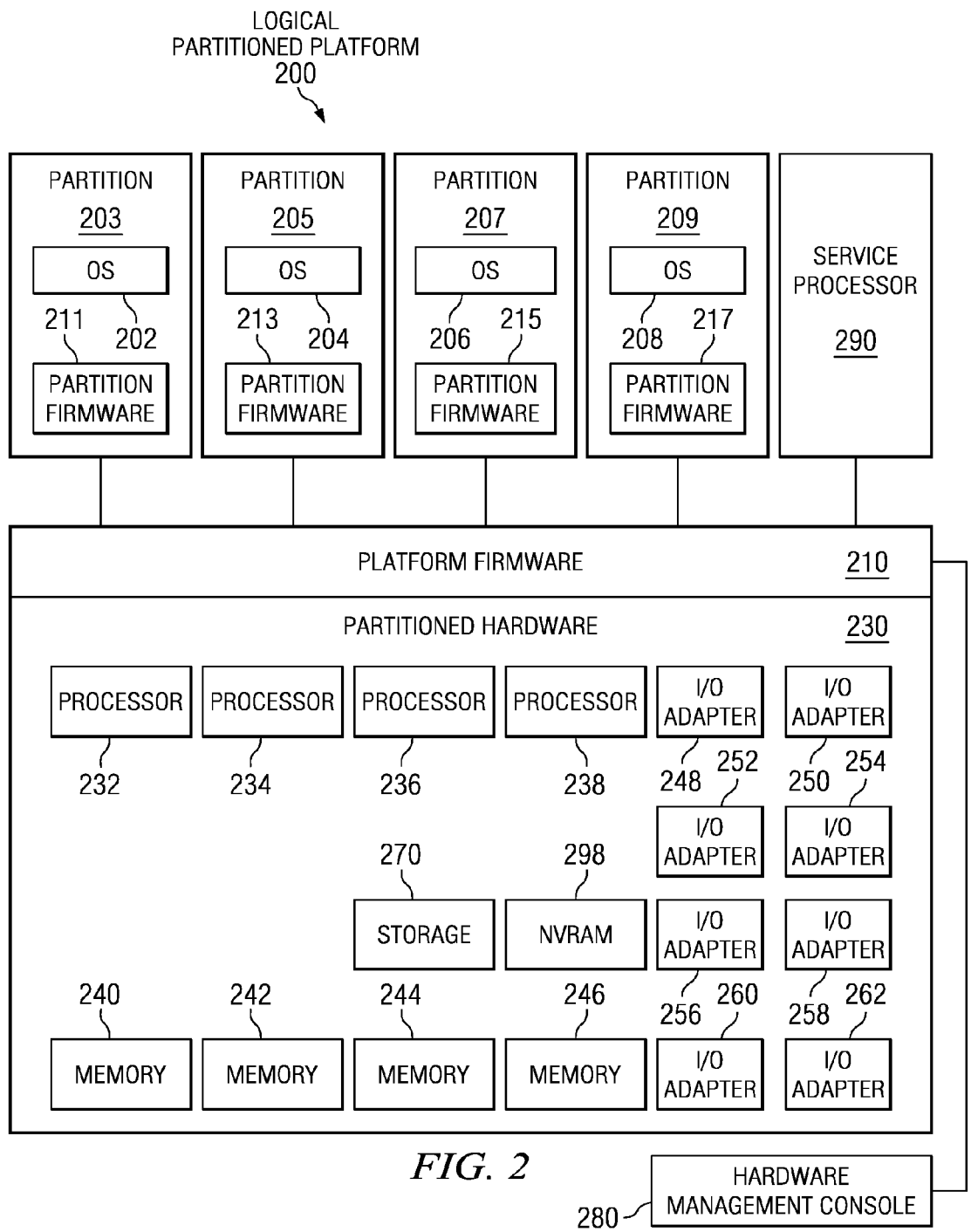
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The present invention provides an improved method, apparatus, and computer instructions for preventing the loading and execution of unauthorized operating systems. This mechanism is especially useful in logically partitioned data processing systems. The mechanism of the present invention requires a key or key code to be entered through the hardware management console prior to the activation of a partition in which this key code must match this one contained in the operating system. The key code in the operating system is passed to platform firmware, such as platform firmware 210 in FIG. 2. If the key codes match, the operating system is allowed to register and complete loading. Otherwise, the operating system is terminated.

Figure 3:
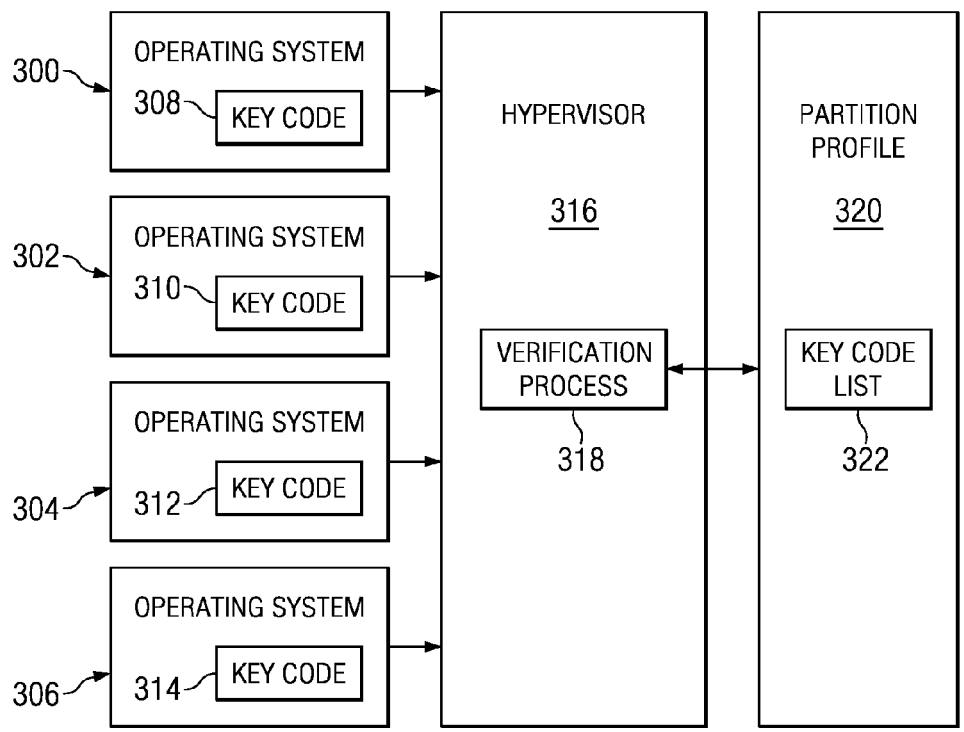
FIG. 3 is a diagram illustrating components used in preventing the loading and execution of unauthorized operating systems in a logical partitioned data processing system in accordance with a preferred embodiment of the present invention.

With reference now to FIG. 3, a diagram illustrating components used in preventing the loading and execution of unauthorized operating systems in a logical partitioned data processing system is depicted in accordance with a preferred embodiment of the present invention. In this illustrative example, operating systems 300, 302, 304, and 306 are present. These operating systems are similar to those illustrated in FIG. 2 in partitions 203, 205, 207, and 209. Each licensed operating system in these illustrative examples includes an identifying serial number within the code. This serial number is used as a key code. As can be seen, key codes 308, 310, 312, and 314 are present within operating systems 300, 302, 304, and 306.

Each of these operating systems pass their key codes to platform firmware, such as hypervisor 316 during the loading and registration phase. This phase is the period of time during which an operating system loads itself into a partition and registers itself to gain access to hardware resources. In these illustrative examples, hypervisor 316 includes verification process 318, which is used to verify that the operating systems that are being loaded are authorized operating systems.

In this illustrative embodiment, verification process 318 checks the key code supplied by an operating system for registration with key codes for authorized operating systems. These key codes are located in partition profile 320 in key code list 322. Partition profile 320 is located in a non-volatile memory, such a NVRAM 192 in FIG. 1.

If the key code provided by the operating system is valid, hypervisor 316 will register the operating system and allow it continued access to the hardware resources. If the key code provided by the operating system does not match one in key code list 322, the operating system is terminated.

Partition profile 320 and key code list 322 is generated by a system administrator having proper access to an HMC in these illustrative examples. A key code is entered for each operating system that is to be loaded on to the LPAR data processing system. These key codes are stored in key code list 322 in partition profile 320.

During loading of operating systems 300, 302, 304, and 306, these operating systems will make calls to access hardware as part of the initialization process, prior to the operating systems registering with hypervisor 316. Verification process 318 in hypervisor 316 determines whether the calls made are necessary to load and initialize the operating system before registration occurs. If these calls are needed, the calls are processed and access to the hardware is provided. Otherwise, access to the hardware is prevented and the operating system making an unnecessary hardware call is terminated.

Examples of necessary calls include calls to map memory for the operating system. Memory must be mapped by the operating system for resources to function. In a logical partitioned data processing system, platform firmware, such as a hypervisor, controls the hardware, including the memory. Therefore, the memory must be mapped for a physical address to a logical address to allow the use of this memory by the operating system. Another example of necessary calls includes those for I/O. I/O resources are needed to communicate with the outside world. Similar mappings are needed to map a physical address of an I/O adapter into the logical address range used by the operating system.

In contrast, unnecessary calls include calls to set or read items such as the time of day or virtual terminal support.

In this manner, unauthorized operations systems are prevented from accessing hardware beyond that needed to initialize operating systems to a point where registration may occur. An unauthorized operating system attempting to avoid registration may be terminated using this feature.

Figure 4:
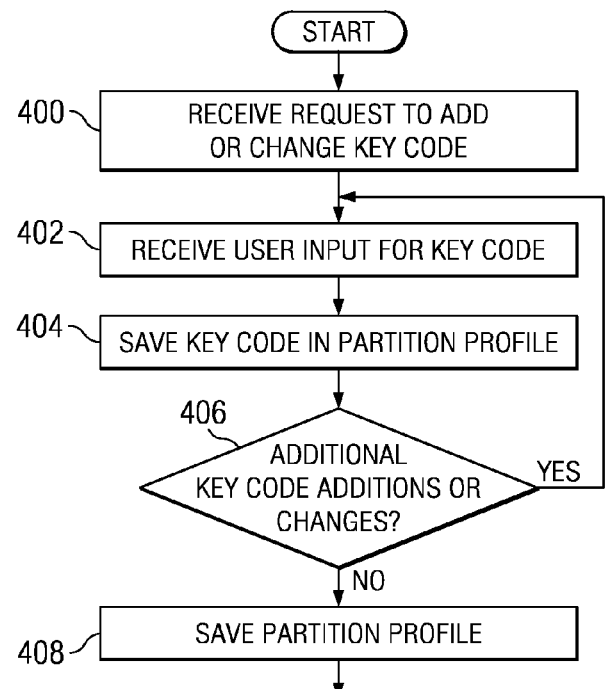
FIG. 4 is a flowchart of a process for creating a list of authorized operating systems in accordance with a preferred embodiment of the present invention.

With reference now to FIG. 4, a flowchart of a process for creating a list of authorized operating systems is depicted in accordance with a preferred embodiment of the present invention. The process illustrated in FIG. 4 may be implemented in software for use on a hardware management console, such as hardware management console 280 in FIG. 2.

The process begins by receiving a request to add or change a code key (step 400). Next, user input for key code is received (step 402). The input in step 402 may occur through a graphical user interface provided at a hardware management console. These key codes may be entered as part of creating or modifying a partition profile. Then, the key code is saved in the partition profile (step 404). Next, a determination is made as to whether additional key code additions or changes are present (step 406). If there are not additional key code additions or changes, then the partition profile is saved (step 408) with the process terminating thereafter.

Referring back to step 406 if additional key codes or changes are present, then the process returns to step 402 as described above.

In these illustrative examples, the partition profile is saved in a data structure in a non-volatile memory, such as NVRAM 192 in FIG. 1. This profile information is used by the platform firmware when an LPAR data processing system boots up or is started. With this information, the mechanism of the present invention may prevent unauthorized operating systems from loading and executing.

With reference now to FIG. 5, a flowchart of a process for handling a registration request from an operating system is depicted in accordance with a preferred embodiment of the present invention. The process illustrated in FIG. 5 may be implemented in platform firmware, such as verification process 318 in hypervisor 316 in FIG. 3.

The process begins by receiving a registration request from an operating system (step 500). Then, a determination is made as to whether a key code is present in the registration request (step 502). If a key code is present, then the key code in the registration request is compared to a key code list (step 504). The key code list is one that may be generated through a process such as that illustrated in FIG. 4.

Next, a determination is made as to whether there is a match (step 506). If a match is present, the operating system is registered (step 508) with the process terminating thereafter.

Referring back to step 502, if a key code is not present in the registration request, then the operating system is terminated (step 510). Next, a security message is sent (step 512) with the process terminating thereafter. This security message may include information about the operating system that attempted to load, the time at which the attempt was made, and other information needed to identify the source of the unauthorized operating system. In step 506, if a match is not present between the key code received from the operating system and a key code in the key code list, the process proceeds to step 510 as described above.

With reference now to FIG. 6, a flowchart of a process for handling requests for hardware services is depicted in accordance with a preferred embodiment of the present invention. The process illustrated in FIG. 6 may be implemented in platform firmware, such as verification process 318 in hypervisor 316 in FIG. 3.

The process begins by receiving a call for a hardware service from an operating system (step 600). Next, a determination is made as to whether the operating system is registered (step 602). In these illustrative examples, a registered operating system is one that has been verified as an authorized operating system, such as through the process illustrated in FIG. 5 above.

If the operating system is not registered, then a determination is made as to whether hardware service is needed to set up the operating system (step 604). In step 604, needed hardware services are those needed by the operating system to load and initialize to a point that the operating system is ready to register itself with the platform firmware. Prior to this point, some hardware services are required by the operating system to load and initialize itself for normal operations. Examples of needed hardware services are those to map memory resources and I/O resources for use by the operating system. If the hardware service is needed to set up the operating system, then a call to provide hardware service is processed (step 606) with the process terminating thereafter.

Referring back to step 602, it the operating system is registered, then the process terminates. In step 604, if the hardware service is not needed to set up or complete initialization of the operating system, then the operating system is terminated (step 608). Next, a security message is sent (step 610) with the process terminating thereafter. In this manner, this process prevents operating systems from loading and executing without registering with the platform firmware.

Thus, the present invention provides an improved method, apparatus, and computer instructions for preventing loading of unauthorized or rogue operating systems. This feature is provided by requiring a key code or some other unique identifier to be sent by the operating system for use in verifying whether the operating system is authorized. Authorized key codes are maintained and compared to the key code provided to the operating system. If a match occurs, the operating system is allowed to continue execution. Otherwise, the operating system is terminated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A multi-partitioned computer that manages operating systems, the multi-partitioned computer comprising:
   a storage having computer usable program code encoded thereon;
   a bus system connecting the storage to a processor;
   wherein the processor executes the computer usable program code: to receive, by the multi-partitioned computer that is concurrently executing a plurality of different operating systems, a request from a particular operating system during the loading of the particular operating system in the multi-partitioned computer to register the particular operating system for access to hardware in the multi-partitioned computer, wherein the request includes a key code for the particular operating system;
   responsive to receiving the request, to determine whether the particular operating system is an authorized operating system using the key code wherein the determining step includes the processor executes the computer usable program code: to compare the key code to a set of key codes for authorized operating systems; and to determine whether a match is present between the key code and any key code in the set of key codes; and
   to register the particular operating system if the particular operating system is an authorized operating system.

2. The multi-partitioned computer of claim 1, wherein the processor executes the computer usable program code to terminate loading of the particular operating system if the particular operating system is an unauthorized operating system.

3. The multi-partitioned computer of claim 1, wherein the set of key codes is located in a partition profile.

4. The multi-partitioned computer of claim 1, wherein the set of key codes are defined through a hardware management console.

5. The multi-partitioned computer of claim 3, wherein the partition profile is stored in a nonvolatile memory.

6. The multi-partitioned computer of claim 1, wherein the key code for the particular operating system is embedded within the particular operating system and is a unique key code.

7. The multi-partitioned computer of claim 1, wherein the receiving means, the determining step, and the registering step are performed in platform firmware.

8. The multi-partitioned computer of claim 1, wherein the processor executing the computer usable program code to determine whether the particular operating system is an authorized operating system using the key code further comprises the processor executing the computer usable program code:
   responsive to receiving a call to access hardware, to determine whether the particular operating system is registered;
   responsive to receiving the call to access the hardware, to determine whether the call is necessary to setup the particular operating system; and
   to terminate the particular operating system if the particular operating system is not registered and if the call if unnecessary to setup the particular operating system.

9. A non-transitory computer storage medium having instructions encoded thereon for managing operating systems, the computer storage medium comprising:
   first instructions for receiving, by the multi-partitioned computer that is concurrently executing a plurality of different operating systems, a request from a particular operating system during the loading of the particular operating system in the multi-partitioned computer to register the particular operating system for access to hardware in the multi-partitioned computer, wherein the request includes a key code for the particular operating system;
   second instructions, responsive to receiving the request, for determining whether the particular operating system is an authorized operating system using the key code, wherein the second instructions includes instructions: for comparing the key code to a set of key codes for authorized operating systems; and for determining whether a match is present between the key code and any key code in the set of key codes; and
   third instructions for registering the particular operating system if the particular operating system is an authorized operating system.

10. The non-transitory computer storage medium of claim 9 further comprising:
    fourth instructions for terminating the particular operating system if the particular operating system is an unauthorized operating system.

11. The non-transitory computer storage medium of claim 9, wherein the set of key codes is located in a partition profile.

12. The non-transitory computer storage medium of claim 9, wherein the set of key codes are defined through a hardware management console.

13. The non-transitory computer storage medium of claim 11, wherein the partition profile is stored in a nonvolatile memory.

14. The non-transitory computer storage medium of claim 9, wherein the key code for the particular operating system is embedded within the particular operating system and is a unique key code.

15. The non-transitory computer storage medium of claim 9, wherein the first instructions, the determining step, and the registering step are performed in platform firmware.

16. The non-transitory computer storage medium of claim 9 further comprising:
- fourth instructions, responsive to receiving a call to access hardware, for determining whether the particular operating system is registered;
- fifth instructions, responsive to receiving the call to access the hardware, for determining whether the call is necessary to setup the particular operating system; and
- sixth instructions for terminating the particular operating system if the particular operating system is not registered and if the call if unnecessary to setup the particular operating system.

\* \* \* \* \*